(12) United States Patent
Gadkaree et al.

(10) Patent No.: US 9,187,333 B2
(45) Date of Patent: Nov. 17, 2015

(54) CARBON ACTIVATION IN A MICROWAVE FLUIDIZED BED PROCESS

(75) Inventors: Kishor Purushottam Gadkaree, Painted Post, NY (US); Andrew Fleitz Husted, Wellsburg, NY (US); Naveen Kekre, Greenwood, IN (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/590,682

(22) Filed: Aug. 21, 2012

(65) Prior Publication Data

US 2014/0056799 A1 Feb. 27, 2014

(51) Int. Cl.
*C01B 31/08* (2006.01)
*C01B 31/10* (2006.01)

(52) U.S. Cl.
CPC ............... *C01B 31/10* (2013.01); *C01B 31/086* (2013.01)

(58) Field of Classification Search
CPC .............................. C01B 31/086; C01B 31/10
USPC ................................ 502/430; 423/445 R, 460
See application file for complete search history.

(56) References Cited

U.S. PATENT DOCUMENTS

| 4,002,533 A * | 1/1977 | Repik et al. .................. 201/1 |
| 5,482,915 A * | 1/1996 | Golden et al. ................ 502/417 |
| 6,337,302 B1 * | 1/2002 | Teng et al. .................... 502/432 |
| 7,829,030 B2 * | 11/2010 | Beech et al. .................. 422/139 |
| 8,318,356 B2 | 11/2012 | Gadkaree et al. ........... 429/231.8 |
| 2010/0150814 A1 | 6/2010 | Gadkaree et al. ............. 423/445 |

FOREIGN PATENT DOCUMENTS

WO 2010/042321 4/2010

OTHER PUBLICATIONS

A.N. Hayhurst, A.D. Lawrence, The devolatilization of coal and a comparison of chars produced in oxidizing and inert atmospheres in fluidized beds, Combustion and Flame, vol. 100, Issue 4, Mar. 1995, pp. 591-604, ISSN 0010-2180, http://dx.doi.org/10.1016/0010-2180(94)00109-6.*
Yang, Kunbin, et al. "Preparation of high surface area activated carbon from coconut shells using microwave heating." Bioresource technology 101.15 (2010): 6163-6169.*
Hashimoto, K.; Miura, K.; Yoshikawa, F.; Imai, I. Change in Pore Structure of Carbonaceous Materials during Activation and Adsorption Performance of Activated Carbon. Ind. Eng. Chem. Process Des. Dev. 1979, 18, 72.*
A. Ahmadpour et al., "The Preparation of Active Carbons from Coal by Chemical and Physical Activation", *Carbon*, vol. 34, No. 4, pp. 471-479, 1995.

(Continued)

*Primary Examiner* — Richard M Rump
(74) *Attorney, Agent, or Firm* — John L. Haack; Michael W. Russell

(57) ABSTRACT

A method for forming activated carbon from carbon feedstock involves forming particles of the carbon feedstock, introducing the carbon feedstock particles into a microwave reaction chamber and forming a fluidized bed of the particles within the chamber, introducing steam into the reaction chamber, and introducing microwaves into the reaction chamber to heat the particles using microwave energy and react the heated particles with the steam to form activated carbon.

18 Claims, 2 Drawing Sheets

(56) References Cited

OTHER PUBLICATIONS

A. Ahmadpour et al., "The Preparation of Activated Carbon from Macadamia Nutshell by chemical activation", *Carbon*, vol. 35, No. 12, pp. 1723-1732, 1995.

A.G. Pandolfo, et al., "Carbon Properties and Their Role in Supercapacitors", *Journal of Power Sources*, 2006, vol. 157, pp. 11-27.

H. Teng, et al., "Preparation of porous carbons from Phenol-formaldehyde resins with chemical and physical activation", *Carbon*, 2000, vol. 38, pp. 817-824.

S.R. Tennison, "Phenolic-resin-derived activated carbons", Applied Catalysis A: General, 1999, pp. 289-311.

Z. Yue, et al.., "Preparation of fibrous porous materials by chemical activation 1. ZnCl2 activation of plymer-coated fibers", Carbon, 2002, vol. 40, pp. 1181-1191.

Illán-Gómez, et al., "Activated Carbons From Spanish Coals 2 Chemical Activation", *Energy & Fuels*, 1996, vol. 10, pp. 1108-1114.

Kadlec, et al., "Structure of Pores of Active Carbons Prepared by Water-Vapour and Zinc-Dichloride Activation", *Carbon*, 1970, vol. 8, pp. 321-331.

O. Treusch, et al., "Basic Properties of Specific Wood-Based Materials Carbonised in a Nitrogen Atmosphere", *Wood Sci. Technol.*, 2004, vol. 38, pp. 323-333.

M. Cadek, et al., "Bio-Based Materials for Supercapacitor", *Carbon*, 2007, Seattle, WA, pp. 1-3.

\* cited by examiner

CARBON ACTIVATION IN A MICROWAVE FLUIDIZED BED PROCESS

BACKGROUND

The present disclosure relates generally to methods for forming activated carbon, and more particularly to microwave energy-assisted, physical activation of carbon using a fluidized bed reactor.

Energy storage devices such as ultracapacitors may be used in a variety of applications such as where a discrete power pulse is required. Example applications range from cell phones to hybrid vehicles. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporation into high energy density devices are known. The carbon materials, which form the basis of the electrodes, can be made from natural or synthetic precursor materials. Natural precursor materials include coals, nut shells, and biomass. Synthetic precursor materials typically include phenolic resins. With both natural and synthetic precursors, carbon materials can be formed by carbonizing the precursor and then activating the resulting carbon. The activation can comprise physical (e.g., steam) or chemical activation.

Chemical activation processes, which use an activating agent such as KOH, are typically more expensive than physical activation processes due to the added cost of the chemical activating agent raw materials and the attendant costs associated with processing and handling the same. For instance, chemical activation processes can involve the generation of corrosive bi-products, which require abatement solutions that can add to the process cost. Physical activation with steam, on the other hand, is typically more environmentally friendly and thus can be advantageous when considering the direct and indirect costs associated with the raw materials. However, steam activation processes typically use conventional furnaces to heat the reactants, which involve long activation cycle times at high temperatures.

Accordingly, it would be an advantage to provide activated carbon materials and processes for forming activated carbon materials using a more economical steam activation route. The resulting activated carbon materials can be used to form carbon-based electrodes that enable efficient, long-life and high energy density devices.

SUMMARY

A method for forming activated carbon comprises providing a carbon feedstock, forming particles of the carbon feedstock, forming a fluidized bed of the particles within a microwave reaction chamber, introducing steam into the reaction chamber, heating the particles using microwave energy by introducing microwaves into the reaction chamber, and reacting the heated particles with the steam to form activated carbon.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

The following detailed description can be best understood when read in conjunction with the following drawings, where like structures are indicated with like reference numerals and in which.

DETAILED DESCRIPTION

Figure 1:
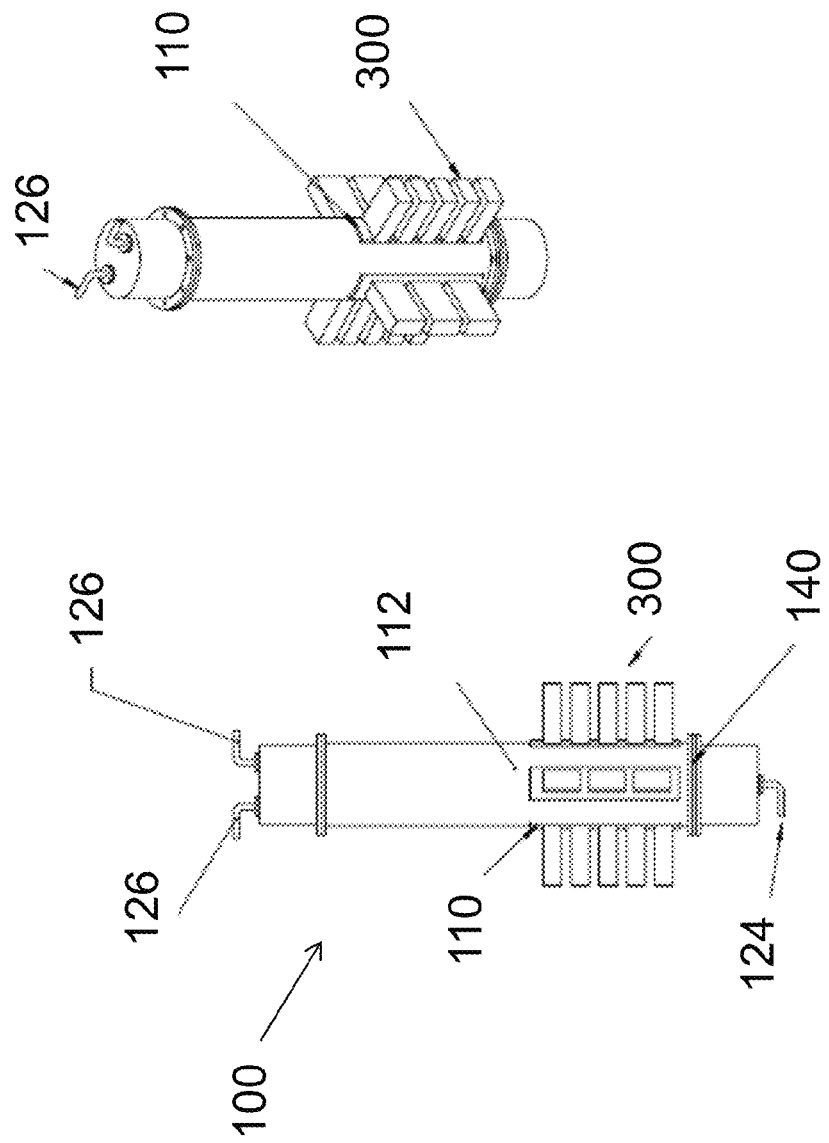
FIG. 1 is a schematic illustration of a fluidized bed microwave reactor for preparing activated carbon according to various embodiments of the disclosure.

A method for making activated carbon from a carbon feedstock comprises forming particles of the carbon feedstock and then forming a fluidized bed of the particles within a microwave reaction chamber. Steam is introduced into the reaction chamber and microwave energy is used to heat the particles and the steam and react the heated particles with the steam to form activated carbon. Compared with convectively-heated physical as well as chemical activation processes, the presently-disclosed microwave energy-assisted activation process enables significantly shorter process times, which advantageously increases throughput and lowers cost. In particular, by focusing microwave energy on the carbon feedstock and the steam, the reactants can be heated efficiently, which together with the shorter process time reduces power consumption. Further, by forming an active, fluidized dispersion of the feedstock particles during the activation process, a uniformly-activated carbon material can be obtained.

According to embodiments, carbon feedstock may comprise a carbonized material such as coal or a carbonized material derived from a carbon precursor. Example carbon precursors include natural materials such as nut shells, wood, biomass, etc. and synthetic materials such as phenolic resins, including poly(vinyl alcohol) and (poly)acrylonitrile, etc. For instance, the carbon feedstock can be derived from edible grains such as wheat flour, walnut flour, corn flour, corn starch, corn meal, rice flour, and potato flour. Other carbon precursors include coconut husks, beets, millet, soybean, barley, and cotton. The carbon precursor can be derived from a crop or plant that may or may not be genetically-engineered.

Further example carbon precursor materials and associated methods of forming carbon feedstock material are disclosed in commonly-owned U.S. patent application Ser. Nos. 12/335,044, 12/335,078, 12/788,478 and 12/970,073, the entire contents of which are hereby incorporated by reference.

Carbon precursor materials can be carbonized to form carbon feedstock by heating in an inert or reducing atmosphere. Example inert or reducing gases and gas mixtures include one or more of hydrogen, nitrogen, ammonia, helium and argon. In an example process, a carbon precursor can be heated at a temperature from about 500° C. to 900° C. (e.g., 500, 550, 600, 650, 700, 750, 800, 850 or 900° C.) for a predetermined time (e.g., 0.5, 1, 2, 4, 8 or more hours) and then optionally cooled. During carbonization, the carbon precursor decomposes to form carbon feedstock. In embodiments, the carbonization may be performed using a conventional furnace or by heating within the microwave reaction chamber using microwave energy.

Particles of the carbon feedstock suitable for fluidization and activation within a fluidized bed may be prepared by milling or grinding the carbon feedstock. For example, prior to being introduced into the microwave reaction chamber, carbon feedstock may be milled to an average particle size of less than 100 microns, e.g., less than 100, 50, 20 or 10 microns. In embodiments, the carbon feedstock can have an average particle size of about 5, 10, 20, 50 or 100 microns. In further embodiments, the particle size of the carbon feedstock can range from 5 to 10 microns, 5 to 20 microns, 10 to 20 microns, 5 to 50 microns, 10 to 50 microns or 20 to 50 microns.

A fluidized bed can be formed when a quantity of the carbon feedstock particles is placed under appropriate conditions to cause the material to behave as a fluid. In example embodiments, carbon feedstock particles are entrained and fluidized within a microwave reaction chamber using a fluidization gas such as nitrogen gas, for example.

The gas used to fluidize the carbon feedstock can comprise nitrogen gas or consist essentially of nitrogen gas, or other suitable fluidization gas. In alternate embodiments the gas used to fluidize the carbon feedstock may include a mixture of nitrogen gas and steam. Any suitable flow rate and pressure of fluidizing gas may be used, such as 1-20 liters/min, e.g., 1, 2, 4, 10 or 20 liters/min and 20-80 psi, e.g., 20, 30, 40, 50, 60, 70 or 80 psi.

Steam used for activation may be formed in steam generator. The steam may be entrained in a carrier gas, such as nitrogen, and carried into the reaction vessel. A flow rate and pressure of the carrier gas may range from 1-50 ml/min, e.g., 1, 2, 4, 10, 20 or 50 ml/min, which may be adjusted, for example, to provide a suitable concentration of steam within the reaction vessel. For example, a flow rate of water into the reactor can range from 1 to 50 ml/min per 100 g of carbon, which for a 4.25 inch diameter reactor at an internal pressure of about 0 psi, corresponds to a velocity of water of about 0.01-0.5 msec. In further embodiments, a velocity of water into the reactor can range from about 0.01 to 2 msec.

It will be appreciated that the fluidization and activation of the feedstock particles are dynamic processes in which the fluidization and activation may be performed simultaneously, and that the gas and the steam may interact during the respective processes of fluidization and activation. For instance, a first carrier gas stream may be used to fluidize the carbon feedstock particles within the reaction chamber while a second carrier gas stream may be used to introduce steam into the reaction chamber. In further embodiments, a single gas stream comprising nitrogen and steam may be used to fluidize the particles and also introduce steam into the reaction chamber.

In embodiments, the carrier gas may be heated prior to or during delivery of the carrier gas to the reaction chamber. For example, the carrier gas can be heated to a temperature of at least 400° C. prior to being introduced into the reaction chamber. Such pre-heating of the carrier gas can improve microwave energy coupling to, and heating of, the carbon feedstock particles by minimizing or even eliminating the need to expend microwave energy to heat the carrier gas. Pre-heating the carrier gas can enable more efficient heating of the carbon feedstock (and steam), which can result in more uniform activation of the carbon feedstock.

During exposure to the steam, microwave energy can heat the carbon feedstock particles to a temperature ranging from about 500 to 900° C. (e.g., 500, 550, 600, 650, 700, 750, 800, 850 or 900° C.) for a period of time that is effective to react the fluidized particles with the steam and form activated carbon. Example reaction times may be less than 4 hours (e.g., 10, 20, 40, 60, 90, 120, 180 or 240 minutes).

The microwave-assisted steam activation can be carried out using one or more heating steps at one or more reaction temperatures. For instance, an initial activation step can be performed by heating the carbon feedstock particles to a first activation temperature and maintaining the first activation temperature for a first period of time, followed by heating the carbon feedstock to a second activation temperature and maintaining the second activation temperature for a second period of time. The first activation temperature and first period of time may each respectively be greater than, less than, or equal to the second activation temperature and the second period of time.

A schematic of an example fluidized bed reactor is shown in FIG. 1. The reactor 100 comprises a vessel 110 defining a reactor volume 112 that is in fluid communication with each of a carrier gas source and a steam source (not shown). An example reactor has a vessel with internal diameter of 4.25 in, though larger and smaller vessel dimensions are contemplated.

To provide gas flow into the reaction volume, the vessel 110 is fitted with a distributor plate 140 within a lower portion of the vessel. The distribution plate 140 is configured to support carbon feedstock particles within the reactor volume 112 while permitting a through-flow of carrier gas and optionally steam. For instance, steam may be introduced into the reactor together with the fluidization gas via the distribution plate. In addition to or in lieu of introducing steam via the distribution plate, the fluidization gas may be introduced via the distribution plate while the steam is injected into the vessel via a separate inlet, for example an inlet located in a sidewall of the vessel.

Particles of the carbon feedstock in the reactor are typically supported by the distributor plate 140, which can be a porous plate adapted to permit the passage of gaseous species but not solid particles.

In operation, the carrier gas is forced via gas inlet 124 through the distributor plate 140 and up through the carbon feedstock particles. At lower carrier gas velocities, the particles remain substantially in place as the carrier gas passes between the particles. As the carrier gas velocity is increased, however, the force of the carrier gas on the solid particles can eventually be sufficient to balance the weight of the carbon feedstock material. The resulting equilibrium point is referred to as incipient fluidization and occurs at a minimum fluidization velocity. Once this minimum velocity is surpassed, the contents of the reactor bed will expand, and swirl around like a fluid. Fluidization and carrier gases can exit the reactor volume via gas outlets 126.

In an example process, a static depth of carbon particles within a 4.25 inch diameter reactor is about 2 inches, which can increase to 2.1 inches or more (e.g., 2.1, 2.25 or 2.5 inches) with the introduction of the fluidization and/or carrier gas.

Configured external to the vessel 110 are one or more microwave sources 300 that are configured to introduce microwave energy into the reactor volume 112. The microwave sources 300 can produce microwaves having a wavelength from 1 mm to 1 m (frequencies ranging from 300 MHz to 300 GHz), though particular example microwave frequencies used to form activated carbon include 915 MHz, 2.45 GHz, and microwave frequencies within the C-band (4-8 GHz).

One example process for activating the carbon feedstock is a batch-type process where a known quantity of particulate carbon feedstock material is initially loaded into the vessel 110. The carbon feedstock is can then be fluidized and activated within the vessel. A further example process for activating the carbon feedstock is a continuous-type process where un-activated carbon feedstock can be continuously or semi-continuously fed into the reactor vessel 110, while activated carbon feedstock can be continuously or semi-continuously removed from the reactor vessel 110.

One example process for activating carbon feedstock involves the sequential steps of introducing particles of carbon feedstock into a reactor vessel, fluidizing the particles, introducing steam into the vessel, and introducing microwave energy into the vessel. In one embodiment, steam is continuously introduced into the reactor while the microwave energy is provided. In an alternate embodiment, the flow of steam can be variable throughout the activation process.

In embodiments, the vessel walls can be heated (e.g., to a temperature greater than about 110° C. or greater than about 150° C.) to minimize condensation of the steam within the reactor. Following activation, the activated carbon can be dried and optionally ground.

After completion of the activation step, the activated carbon can be removed from the reaction chamber and incorporated into a carbon-based electrode of an ultracapacitor.

An ultracapacitor, also known as a double-layer capacitor, polarizes an electrolytic solution to store energy electrostatically. Though it is an electrochemical device, no chemical reactions are involved in the energy storage mechanism. The mechanism is reversible, which allows the ultracapacitor to be charged and discharged many times.

Ultracapacitors typically comprise two porous electrodes that are isolated from electrical contact with each other by a porous dielectric separator. The separator and the electrodes are impregnated with an electrolytic solution that allows ionic current to flow between the electrodes while preventing electronic current from discharging the cell. Each electrode is typically in electrical contact with a current collector. The current collector, which can comprise a sheet or plate of electrically-conductive material (e.g., aluminum) can reduce ohmic losses while providing physical support for the porous electrode material.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

Figure 2:
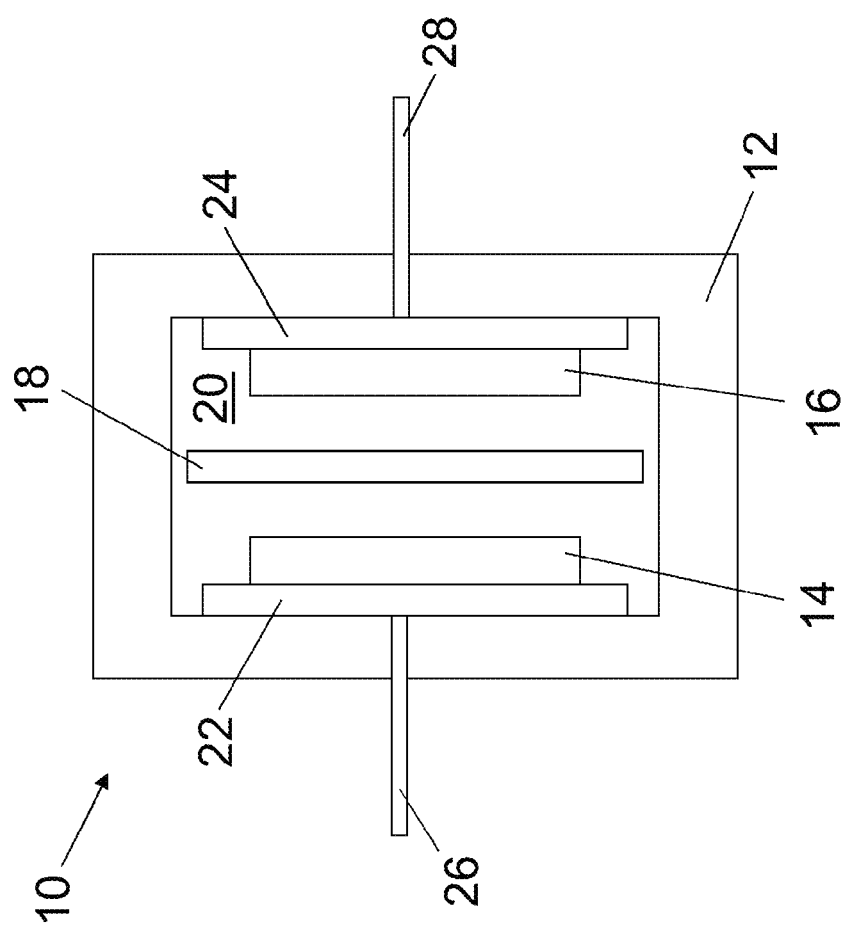
FIG. 2 is a schematic illustration of an example ultracapacitor.

FIG. 2 is a schematic illustration of an example ultracapacitor. Ultracapacitor 10 includes an enclosing body 12, a pair of current collectors 22, 24, a positive electrode 14 and a negative electrode 16 each respectively formed over one of the current collectors, and a porous separator layer 18. Electrical leads 26, 28 can be connected to respective current collectors 22, 24 to provide electrical contact to an external device. Electrodes 14, 16 comprise porous activated carbon layers that are formed over the current collectors. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage. Ultracapacitors can have a jelly roll design, prismatic design, honeycomb design, or other suitable configuration.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the carbon-based electrodes 14, 16 from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/011,066, the disclosure of which is incorporated herein by reference. An example quaternary ammonium salt is tetraethylammonium tetrafluoroborate (($Et)_4NBF_4$).

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include $\beta$-butyro-lactone, $\gamma$-butyrolactone, $\gamma$-valerolactone and $\delta$-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydofuran, 2-methyl-tetrahydro furan, 1,3-dioxolan, 1,2-dioxolan, 2-methyldioxolan and 4-methyldioxolan. A combination of two or more solvents may also be used.

Optionally, in conjunction with the foregoing methods for producing a carbon-based electrode, the activated carbon can be mixed with carbon black and/or a polymeric binder such as polytetrafluroethylene (PTFE) or other suitable binder and compacted to form the carbon-based electrode.

Electrical properties of the carbon can be obtained by incorporating the activated carbon into carbon-based electrodes, which are in turn incorporated into an ultracapacitor. To form the carbon-based electrodes, the activated carbon is first combined with conductive carbon (e.g., Black Pearls®, which is marketed by Cabot Corporation, Boston, Mass.) and Teflon® (PTFE). The carbon black serves as a conductive additive and the PTFE serves as a binder.

By way of example, a carbon paper having a thickness in the range of about 100-300 micrometers can be prepared by rolling and pressing a powder mixture comprising 60-90 wt. % activated carbon, 5-20 wt. % carbon black and 5-20 wt. % PTFE. The carbon-based electrodes can be rolled into jelly roll using a cellulosic separator, and then placed into an aluminum can.

Ultracapacitors can have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, on the other hand, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

The performance of electro-chemical double layer capacitors (EDLCs) comprising carbon-based electrodes can be intimately related to the properties of the carbon. The activated carbon materials disclosed herein can be used to form carbon-based electrodes for economically viable, high power, high energy density devices. The properties of the activated carbon, in turn, can be gauged by evaluating the surface area, porosity and pore size distribution of the material, as well as by evaluating the electrical properties of a resulting ultracapacitor. Relevant electrical properties include the area-specific resistance, and the specific capacitance.

In embodiments, the activated carbon can be characterized by a high surface area. A carbon-based electrode for an EDLC can include carbon having a specific surface area greater than about 300 m²/g, i.e., greater than 300, 350, 400, 500 or 1000 m²/g. Further, the activated carbon can have a specific surface area less than 2500 m²/g, i.e., less than 2500, 2000, 1500, 1200 or 1000 m²/g.

The activated carbon can comprise micro-, meso- and/or macroscale porosity. As defined herein, microscale pores have a pore size of 2 nm or less and ultra-microscale pores have a pore size of 1 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.2 cm³/g (e.g., greater than 0.2, 0.25, 0.3, 0.35, 0.4, 0.45, 0.5, 0.55, 0.6, 0.65 or 0.7 cm³/g). The portion of the total pore volume resulting from micropores (d≤2 nm) can be about 90% or greater (e.g., at least 90, 94, 94, 96, 98 or 99%) and the portion of the total pore volume resulting from micropores (d≤1 nm) can be about 50% or greater (e.g., at least 50, 55, 60, 65, 70, 75, 80, 85, 90 or 95%).

The pore size distribution of the activated carbon can include ultramicropores, micropores, mesopores and macropores and may be characterized as having a unimodal, bimodal or multi-modal pore size distribution. The ultramicropores can comprise 0.2 cm³/g or more (e.g., 0.2, 0.25, 0.3, 0.35 or 0.4 cm³/g or more) of the total pore volume. Pores having a pore size (d) in the range of 1<d≤2 nm can comprise 0.05 cm³/g or more (e.g., at least 0.1, 0.15, 0.2 or 0.25 cm³/g) of the total pore volume. If present, any pores having a pore size greater than 2 nm, which may include mesopores and/or macropores, can comprise 0.15 cm³/g or less (e.g., less than 0.1 or 0.05 cm³/g) of the total pore volume.

Activated carbon, carbon black and PTFE are blended in the proportion of 85:5:10 by weight together with isopropyl alcohol and rolled into thin sheets, which are laminated onto aluminum current collectors and then dried overnight at about 120° C. The thin sheets have a thickness of about 130 microns.

Button cells for evaluating the electrical properties of the activated were fabricated with free-standing carbon electrodes. A button cell can be formed by punching carbon electrodes having a diameter of 0.625 inches from sheets of the electrode material. A separator is placed between identical carbon electrodes which, in turn, are sandwiched between two conductive carbon-coated aluminum current collectors. A thermoset polymer ring is formed around the periphery of the carbon electrodes to seal the cell, which is filled with an organic electrolyte such as 1.5M tetraethylammonium-tetrafluoroborate (TEA-TFB) in acetonitrile.

The capacitance of the cell ($C_{cell}$) is measured from galvanostatic discharge. The cell is first charged at a constant current (icharge) to a desired potential (e.g., 2.7 V), which is followed by a constant current discharge (idischarge). According to Ohm's law, capacitor current (i) is proportional to the time derivative of capacitor voltage according to:

$$i = C\frac{dV}{dt} \quad (1)$$

where C is capacitance, V is the cell voltage (in Volts) and t is time (in seconds).

By measuring the slope from the galvanostatic discharge curve (cell voltage vs. time), the cell capacitance (in Farads) can then be calculated as:

$$C_{cell} = \frac{i_{discharge}}{\frac{dV}{dt}} \quad (2)$$

The cell capacitance is the harmonic sum of two individual capacitances represented by the electrochemical double layer capacitance of each of the carbon electrodes (capacitors in series). This relationship can be expressed as:

$$\frac{1}{C_{cell}} = \frac{1}{C_1} + \frac{1}{C_2} \quad (3)$$

where $C_1$ and $C_2$ are the double layer capacitances of the individual carbon electrodes in the cell.

The magnitudes of these capacitances can be correlated to the volumetric specific capacitance of the carbon electrodes as:

$$C_1 = C_{sp,1} \times V_1 \quad (4)$$

$$C_2 = C_{sp,2} \times V_2 \quad (5)$$

where $C_{sp,1}$ and $C_{sp,2}$ are specific capacitances of the individual carbon electrodes (in F/cm³) and $V_1$ and $V_2$ are the corresponding electrode volumes. Because the test cell uses electrodes having identical size and composition, $C_1=C_2$, $C_{sp,1}=C_{sp,2}$ ($=C_{sp}$) and $V_1=V_2$ ($=V_{total}/2$, where $V_{total}$ is the total volume (cm³) of carbon electrodes in the cell). Equations (3), (4) and (5) can be combined to give a volumetric capacitance, $C_{sp}$ as:

$$\frac{1}{C_{cell}} = \frac{2}{C_{sp} \times V_{total}} + \frac{2}{C_{sp} \times V_{total}} \quad (6)$$

or, $$C_{sp} = \frac{4 \times C_{cell}}{V_{total}} \quad (7)$$

EXAMPLES

The invention will be further clarified by the following examples.

Example 1

Carbonized wheat flour carbon (200 g) having a mean particle size of about 5 microns was introduced in a fluidized bed reactor. Nitrogen carrier gas heated to 300° C. was introduced in the reactor at 3 liters/min initially to purge air from the vessel and then to fluidize the carbon particles.

Steam was introduced into the system by pumping deionized water into a steam generator at 20 ml/min. Nitrogen gas was mixed with the steam at the bottom inlet of the fluidized bed at 3 liters/min to entrain and transport the steam into reaction vessel. This arrangement allows simultaneous fluidization and activation of the carbon.

Microwave energy was introduced into the vessel to initially heat the carbonized wheat flour for 60 min at 850° C. under flowing $N_2$ and steam. The temperature was then reduced to 750° C. and maintained at 750° C. for an additional 60 min. After the heating cycle, the microwave energy was turned off, the flow of steam was discontinued and then the flow of fluidizing nitrogen gas was stopped.

The resulting activated carbon was removed from the furnace and incorporated into button cells for testing. The activated carbon had a volumetric specific capacitance ($C_{sp}$) of about 75 F/cm³.

Example 2

Comparative

Carbonized wheat flour carbon having a mean particle size of about 5 microns was steam-activated in a controlled atmosphere retort furnace. In the comparative process, 200 g of carbonized wheat flour was placed in a tray in the furnace, which was purged with nitrogen and then heated to 850° C. Steam was introduced into the heated furnace by bubbling nitrogen through water heated to 75° C. The carbon at 850° C. was exposed to the steam for 4 hours upon which time the furnace was allowed to cool to room temperature.

The resulting activated carbon was incorporated into button cell test samples as above. The furnace-activated carbon had a volumetric specific capacitance of about 69 F/cm³.

In the comparative evaluation, the overall cycle time was 12 hours, including the ramp times up to the activation temperature and down to room temperature following activation. Steam was introduced in the furnace only during the activation (4 hours). Contributing to the economics of the comparative process, a continuous flow of nitrogen gas was maintained in the furnace during heat up as well as cool down.

The following Table 1 summarizes process conditions and capacitance results for several activated carbons produced via microwave-assisted steam activation. In each example, a 200 g batch of carbonized wheat flour was fluidized with 55 psi of nitrogen at the specified $N_2$ flow rate and simultaneously exposed to steam at the specified flow rate and microwave energy sufficient to heat the carbon to the specified carbon temperature.

TABLE 1

Example activated carbon processes and results

| Sample ID | $N_2$ flow rate [l/min] | Water flow rate [ml/min] | Carbon Temp. [° C.] | $C_{sp}$ [F/cm³] |
|---|---|---|---|---|
| A (Ex. 1) | 10 | 20 | 850° C., 1 hr then 750° C., 1 hr | 75 |
| B | 5 | 20 | 850° C., 2 hrs | 68 |
| C | 5 | 40 | 850° C., 1.5 hrs | 61 |
| D | 7 | 20 | 750° C., 1 hr | 24 |

As used herein, the singular forms "a," "an" and "the" include plural referents unless the context clearly dictates otherwise. Thus, for example, reference to "a carbon feedstock" includes examples having two or more such "carbon feedstock" materials unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon feedstock that comprises a carbonized material include embodiments where a carbon feedstock consists of a carbonized material and embodiments where a carbon feedstock consists essentially of a carbonized material.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for forming activated carbon, comprising:
providing a carbon feedstock;
forming particles of the carbon feedstock;
introducing the particles into a microwave reaction chamber and flowing a carrier gas into the microwave reaction chamber to form a fluidized bed of the particles;
introducing steam into the microwave reaction chamber;
heating the particles using microwave energy by introducing microwaves into the microwave reaction chamber; and
reacting the heated particles with the steam in the microwave reaction chamber to form activated carbon,
wherein the microwave energy heats the particles to a temperature ranging from about 600 to 900° C., and
wherein the carrier gas is heated to a temperature of at least about 300° C. prior to flowing into the microwave reaction chamber.

2. The method according to claim 1, wherein providing the carbon feedstock comprises carbonizing a carbon precursor in an inert atmosphere at a temperature ranging from about 600 to 900° C.

3. The method according to claim 2, wherein the carbonizing is performed outside of the microwave reaction chamber.

4. The method according to claim 1, wherein the carbon feedstock comprises a carbonized material.

5. The method according to claim 1, wherein the carbon feedstock comprises coal.

6. The method according to claim 1, wherein forming particles of the carbon feedstock comprises milling the carbon feedstock.

7. The method according to claim 1, wherein the carbon feedstock particles have an average particle size of less than 100 microns.

8. The method according to claim 1, wherein the carbon feedstock particles have an average particle size in a range of 5 to 10 microns.

9. The method according to claim 1, wherein the carrier gas is nitrogen gas heated to a temperature of at least 400° C.

10. The method according to claim 1, wherein introducing steam into the reaction chamber comprises entraining the steam in flowing nitrogen gas.

11. The method according to claim 1, wherein introducing the steam into the reaction chamber comprises providing a continuous flow of steam during the heating and reacting.

12. The method according to claim 1, wherein the particles are fluidized within the microwave reaction chamber by flowing nitrogen gas entrained with steam.

13. The method according to claim 1, wherein the activated carbon is formed by heating the fluidized particles and reacting the fluidized particles with the steam for a reaction time of less than 4 hrs.

14. The method according to claim 1, wherein the steam is introduced into the reactor at a water flow rate of 1 to 50 ml/min.

15. The method according to claim 1, wherein the microwave energy heats the particles to a temperature ranging from about 700 to 900° C.

16. The method according to claim 1, wherein the microwave energy heats the particles to a temperature ranging from about 600 to 850° C.

17. A method for forming activated carbon, comprising:
carbonizing at least one carbon precursor in a microwave reaction chamber at a temperature ranging from about 600 to 900° C. to form carbonized feedstock particles;
forming a fluidized bed of the carbonized feedstock particles within the microwave reaction chamber;
introducing steam into the microwave reaction chamber;
heating the carbonized feedstock particles using microwave energy by introducing microwaves into the microwave reaction chamber; and
reacting the heated particles with the steam in the microwave reaction chamber to form activated carbon,
wherein the microwave energy heats the carbonized feedstock particles to a temperature ranging from about 600 to 900° C.

18. The method of claim 17, wherein the at least one carbon precursor is chosen from nut shells, wood, biomass, phenolic resins, wheat flour, corn flour, corn starch, corn meal, rice flour, potato flour, coconut husks, beets, millet, soybean, barley, cotton, and combinations thereof.

* * * * *